H. J. SHRAPNEL.
MUD GUARD FOR VEHICLES.
APPLICATION FILED DEC. 4, 1908.

935,276.

Patented Sept. 28, 1909.
2 SHEETS—SHEET 1.

Witnesses
M. H. Darg
G. Manning

Inventor
Harold J. Shrapnel,
By Wm. C. Boulter
attorney

H. J. SHRAPNEL.
MUD GUARD FOR VEHICLES.
APPLICATION FILED DEC. 4, 1908.

935,276.

Patented Sept. 28, 1909.
2 SHEETS—SHEET 2.

Witnesses
M. W. Darg
G. Manning

Inventor:
Harold J. Shrapnel
By Wm. C. Boulter
Attorney

UNITED STATES PATENT OFFICE.

HAROLD JAMES SHRAPNEL, OF BRIXTON, ENGLAND.

MUD-GUARD FOR VEHICLES.

935,276. Specification of Letters Patent. Patented Sept. 28, 1909.

Application filed December 4, 1908. Serial No. 465,955.

*To all whom it may concern:*

Be it known that I, HAROLD JAMES SHRAPNEL, a subject of the King of Great Britain, residing at 27 Effra road, Brixton, in the county of Surrey, England, have invented certain new and useful Improvements in Mud-Guards for Vehicles, of which the following is a specification.

Heretofore it has been proposed to provide motor cars and the like road vehicles with mud guards arranged to intercept the mud displaced laterally. These lateral mud guards have been placed loosely on the axle or hub so as to lie in a plane parallel to that of the wheel and in some cases secured by wires or other flexible connections to the vehicle above the axle, gravity being depended upon to return the device to proper position after passing an obstruction, which, however, is frequently found ineffective for rapidly moving vehicles. In other cases the lateral guards have been secured by wires or other flexible connections at front and rear to the top mud guard or other fixed part, a spring being connected to the front wire so as to allow the lateral mud guard to yield when the vehicle is passing over stones or other inequalities in or on the road and bring it back again to proper position after passing an obstruction. On account of the steering of the vehicle these last mentioned devices are inapplicable to the front wheels, they are also clumsy, take up space, and require to be fixed in front and in rear.

I overcome the objection hereinbefore referred to by constructing and fitting the lateral mud guard in the manner shown in the accompanying drawings, wherein—

Figure 1:
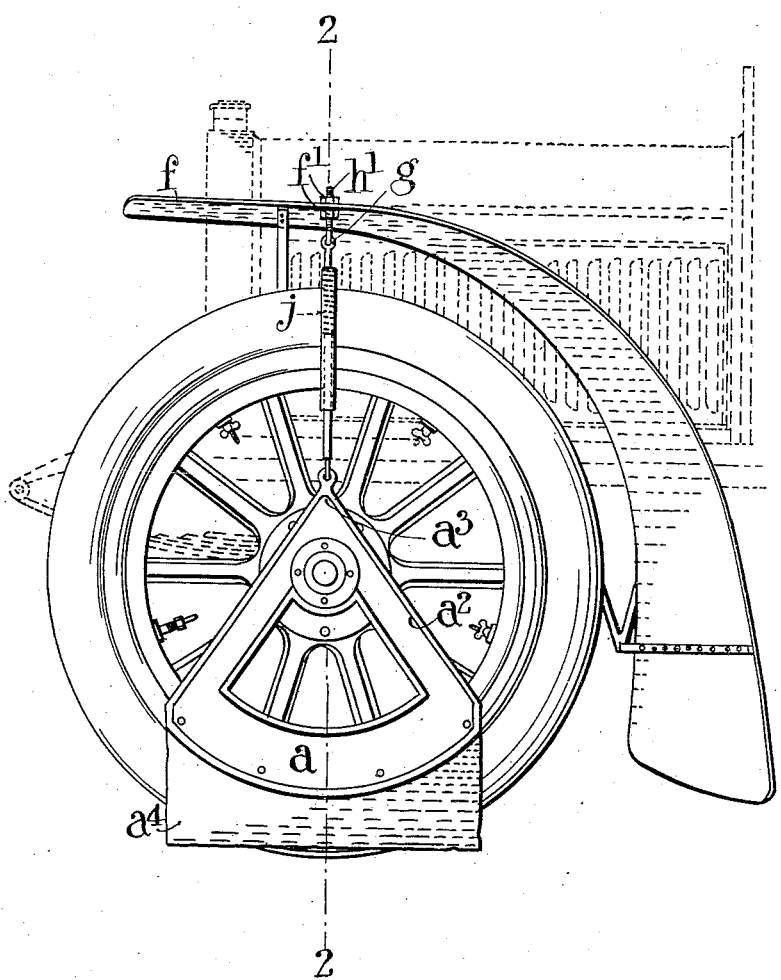
Figure 2:
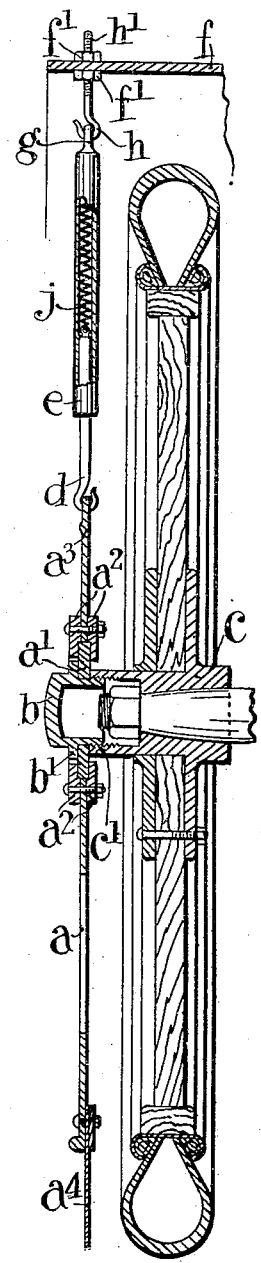
Figure 4:
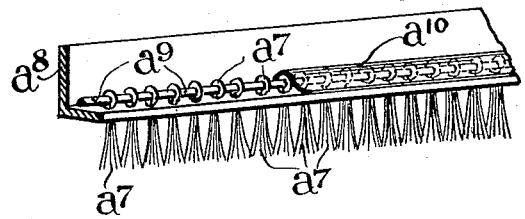
Figure 5:
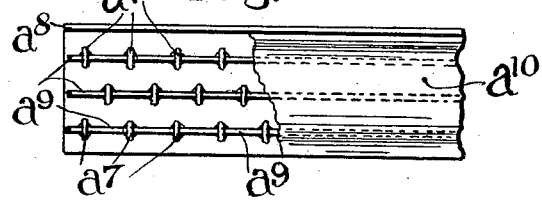

Figure 1 is a side elevation showing part of the front of a motor car with my invention fitted thereto; Fig. 2 is an enlarged section thereof taken on the line 2—2; and Figs. 3, 4 and 5 show modifications of the extension flap.

The same parts are lettered to correspond in all five figures of the drawings.

As shown in Figs. 1 and 2 of the accompanying drawings I make the lateral mud guard $a$ in the general form of a sector of a circle with an aperture at the geometrical center to fit on the axle or hub of the wheel. Preferably a ring or annular piece $a'$ is fitted on the axle cap $b$ and secured thereon between the flange $b'$ on said axle cap and the end $c'$ of the wheel hub $c$ when the cap $b$ is screwed tightly up. The annular piece $a'$ is rotatably mounted between two ring plates $a^2$ which are bolted together to inclose the annular piece $a'$ and the sector shaped mud guard $a$. The lateral mud guard $a$ is extended upward beyond the wheel hub and its upper end $a^3$ is secured, removably or otherwise, to the lowermost $d$ of two tubes $d$, $e$, telescoping one into the other, the upper one $e$ being removably secured to the top fixed mud guard $f$, or other fixed part located approximately vertically above the wheel axle or hub, by means of a loop or eye $g$ on the tube engaging a hook $h$ secured to the top mud guard $f$, or by other suitable means. Preferably the hook $h$ is on the lower end of a screw $h'$ secured to the top mud guard $f$ by nuts $f'$ above and below. A spiral spring $j$ is mounted within the telescoping tubes $d$, $e$, and secured by one end to each tube so as to cause the two normally to close together and thus to return the lateral mud guard to proper position after yielding when passing over a hole or other inequality. The tubes rotate one over the other so as to allow for the steering, the torsion of the spring $j$ returning them to their initial position. As a modification the spring $j$ may be secured directly above and below to the top mud-guard $f$, or other fixed part, and to the upper end $a^3$ of the lateral mud guard.

Figure 3:
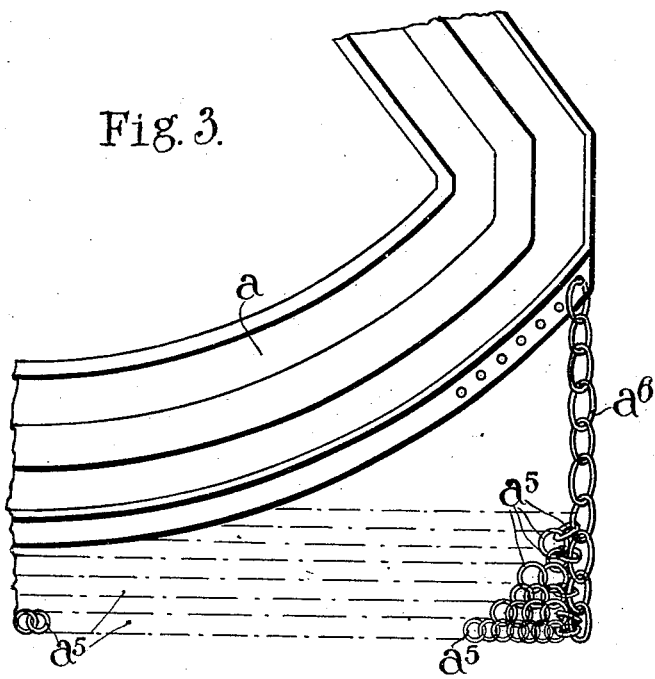

The lateral mud guard $a$ is provided with a removable extension flap $a^4$ made of leather, rubber or other flexible material as shown in Figs. 1 and 2; or, as shown in Fig. 3, it may be made from metallic rings $a^5$ linked together and preferably with a stouter chain border $a^6$ at front and rear. Or, as a further modification the extension flap may be made, as shown in Fig. 4, of strips of wire doubled or looped to form tufts or bristles $a^7$; these doubled tufts are passed through separate perforations in an angle iron or other suitable frame $a^8$ and secured by transverse rods $a^9$ passed between the eyes or looped upper ends of the tufts or bristles $a^7$ and the frame $a^8$; the whole being made water and rust proof by means of a covering piece $a^{10}$ bolted or otherwise secured to the frame $a^8$. Fig. 4 shows only one row of bristles, and Fig. 5 is a plan of the same construction showing three rows of bristles $a^7$ arranged alternately.

Having fully described my invention what I claim and desire to secure by Letters Patent is:—

1. In a vehicle, the combination with an upper mud-guard arranged to partially encircle a wheel of the vehicle, of a lateral mud-guard mounted loosely on the wheel hub and a connection between the said guards, said connection embodying a vertically-arranged spiral spring, and being attached to the lateral mud-guard and also to the upper mud-guard at points approximately vertically above the axle of the vehicle.

2. In a vehicle, the combination with a lateral mud-guard mounted loosely on the hub of a wheel and a connection between said guard and a fixed part of the vehicle comprising vertically-arranged telescopic tubes adapted to rotate one on the other, and a spring arranged within one of the tubes and attached at its ends to said tubes, one of said tubes being attached to the guard at a point above the wheel axle and the other tube being attached to a fixed part of the vehicle at a point approximately vertically above said axle.

3. The combination, with a lateral mud guard mounted loose on the axle or hub and connected by a vertically-arranged spring to a fixed part approximately vertically above the axle of the vehicle, of an extension flap made of metal sections looped or connected together and secured to the frame of the mud guard, substantially as described.

4. In a vehicle the combination with an upper mud-guard partially encircling one of the wheels of the vehicle of a lateral mud-guard mounted loosely on the wheel hub, and a connection between the said guards comprising vertically-arranged telescopic tubes adapted to rotate one on the other, and a spring arranged within one of the tubes and attached at its ends to said tubes, one of said tubes being attached to the lateral guard at a point above the wheel axle and the other tube being attached to the upper guard at a point approximately vertically above said axle.

In testimony whereof I have hereunto set my hand in presence of two subscribing witnesses this sixth day of November 1908.

HAROLD JAMES SHRAPNEL.

Witnesses:
H. J. HASKWORTH,
JOHN H. HASKWORTH.